(12) United States Patent
Vingralek et al.

(10) Patent No.: US 9,244,953 B2
(45) Date of Patent: Jan. 26, 2016

(54) SYSTEMS AND METHODS FOR ASYNCHRONOUS SCHEMA CHANGES

(71) Applicant: Google Inc., Mountain View, CA (US)

(72) Inventors: Radek Vingralek, Belmont, CA (US); Jeffrey Shute, Sunnyvale, CA (US); Eric Christopher Rollins, Mountain View, CA (US); Sukhdeep Sodhi, San Jose, CA (US); Ian Rae, Madison, WI (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/451,878

(22) Filed: Aug. 5, 2014

(65) Prior Publication Data

US 2014/0344311 A1 Nov. 20, 2014

Related U.S. Application Data (63) Continuation of application No. 13/616,427, filed on Sep. 14, 2012, now Pat. No. 8,832,159.

(60) Provisional application No. 61/650,239, filed on May 22, 2012.

(51) Int. Cl.
*G06F 17/00* (2006.01)
*G06F 17/30* (2006.01)

(52) U.S. Cl.
CPC .... *G06F 17/30292* (2013.01); *G06F 17/30595* (2013.01)

(58) Field of Classification Search
CPC ..... G06F 17/30; G06F 17/30289; G06F 7/00; G06F 17/30292; G06F 17/30312; G06F 17/30286
See application file for complete search history.

(56) References Cited

U.S. PATENT DOCUMENTS

| | | |
|---|---|---|
| 6,216,136 B1 | 4/2001 | Ronstrom |
| 7,260,543 B1 | 8/2007 | Saulpaugh et al. |
| 7,512,639 B2 | 3/2009 | Chowdhary et al. |
| 7,664,798 B2 | 2/2010 | Wood et al. |
| 7,970,745 B2 | 6/2011 | Norcott |
| 2005/0071359 A1 | 3/2005 | Elandassery et al. |
| 2005/0198630 A1 | 9/2005 | Tamma et al. |

(Continued)

OTHER PUBLICATIONS

Thomas, Robert H., A Majority Consensus Approach to Concurrency Control for Multiple Copy Databases, ACM Transactions on Database Systems, vol. 4, No. 2, Jun. 1979 (30 pgs).
Sovran, Yair et al., "Transactional storage for geo-replicated systems," In: Proceedings of SOSP, pp. 385-400, 2011. See abstract and pp. 385-390.

(Continued)

*Primary Examiner* — Truong Vo
(74) *Attorney, Agent, or Firm* — Lerner, David, Littenberg, Krumholz & Mentlik, LLP (57) ABSTRACT

This disclosure provides systems and methods for updating database servers with schema changes to avoid concurrency anomalies. The system may receive a snapshot of a table to be updated with a new schema, wherein the snapshot is taken at a given time, and wherein the table includes a number of rows. The system may then read each row from the snapshot and read each row from the table to be updated at a second time. The system may then compare the rows read from the snapshot to the rows read from the table at the second time. Furthermore, the system may determine, based on the comparison, the rows from the snapshot that have not changed between the given time and the second time. The system may then write the rows that have not changed to the table to be updated.

16 Claims, 6 Drawing Sheets

(56) References Cited

U.S. PATENT DOCUMENTS

2006/0277224 A1* 12/2006 Aftab et al. .................. 707/201
2011/0295876 A1 12/2011 Zazrivec et al.

OTHER PUBLICATIONS

International Search Report and Written Opinion for Application No. PCT/US2013/039663 dated Sep. 17, 2013.

* cited by examiner

SYSTEMS AND METHODS FOR ASYNCHRONOUS SCHEMA CHANGES

CROSS-REFERENCE TO RELATED APPLICATIONS

The present application is a continuation of U.S. patent application Ser. No. 13/616,427, filed Sep. 14, 2012, which claims the benefit of the filing date of U.S. Provisional Patent Application No. 61/650,239 filed May 22, 2012, the disclosures of which are hereby incorporated herein by reference.

BACKGROUND

An object-relational database system may be implemented on top of object storage servers. A database schema defines a set of tables, indexes, columns and locks that form a database. The columns can have complex types or structures, such as a "struct" in C++ or a "class" in Java. In accordance with the schema, database servers may handle requests from user devices. Examples of such requests may be to add or drop values from a column or row. The schema may instruct the database server as to how to handle the request. For example, if the request is to add a row, the schema may instruct the database server to correspondingly update the index.

When a change from a first database schema to a second database schema is desired, problems may be encountered for various reasons. For example, the database servers cannot delay requests from user devices due to a schema change, nor can they fail requests due to a schema change. Moreover, the database servers may be distributed across several datacenters, and may not have knowledge of each other. Consequently, the new schema cannot be applied synchronously to all servers, and therefore at a given time, some database servers will use the old schema and other will use the new schemas to read or write the same data. This may result in concurrency anomalies that corrupt the database. For example, a server using the new schema inserts a row. The new schema contains a new index, so the server also inserts a corresponding index entry. Subsequently, another server using the old schema deletes the row. The schema does not contain the new index, and hence the server does not delete the index entry and thereby corrupts the database.

SUMMARY

One aspect of the disclosure provides a method for updating database servers with schema changes to avoid concurrency anomalies. For example, the schema change may be split into a plurality of different stages, where different portions of the new schema are implemented at different times. According to this method, a first set of states for given elements of an existing schema and a second set of states for given elements of a new schema to be implemented in place of the existing schema may be identified. The first and second sets of states may restrict how data associated with the given elements of the existing schema and the given elements of the new schema can be handled. Further, this method may include implementing the new schema in stages based at least on the identified states of the given elements of the new schema, and removing any restrictions placed on the data by the first and second sets of states when the new schema is fully implemented. According to one example, an intermediate schema may be formed at each stage.

Another aspect of the disclosure provides a system for updating a schema in a database. The system may include a controller comprising a processor and a memory in communication with the processor, the memory storing data and instructions executable by the processor to execute a method of identifying a first set of states for given elements of an existing schema and identifying a second set of states for given elements of a new schema to be implemented in place of the existing schema. The first and second sets of states may restrict how data associated with the given elements of the existing schema and the given elements of the new schema can be handled. The processor may further implement the new schema in stages based at least on the identified states of the given elements of the new schema, and remove any restrictions placed on the data by the first and second sets of states when the new schema is fully implemented. Further aspects of the disclosure provide for concurrency control between user operations and bulk updates done on behalf of schema changes during such schema updates, and for maintaining multiple versions of a schema on one server. For example, a method for managing different versions of schema may include maintaining a repository of all schemas running on a server at a given time, identifying a lease period associated with each schema, and identifying operations running on the server, wherein the server is being updated from an old schema to a new schema. A pointer associated with each operation may be identified, wherein the pointer indicates which schema the operation is using. The lease on the new schema may be renewed if an operation includes a pointer to the new schema and the lease period associated with the old schema is expired. The old schema may be deleted if no operations point to it, and all operations on the server may be terminated if some operations point to the old schema, the lease period for the old schema is expired, and other operations point to the new schema.

A device for managing different versions of schemas may include a schema repository, including an identification of all schemas running on a server at a given time, a lease period associated with each schema, an identification of operations running on the server, wherein the server is being updated from an old schema to a new schema, and a pointer associated with each operation, wherein the pointer indicates which schema the operation is using. The device may further include a processor and a memory in communication with the processor, the memory storing instructions executable by the processor to renew the lease on the new schema if an operation includes a pointer to the new schema and the lease period associated with the old schema is expired, delete the old schema if no operations point to it, and terminate all operations on the server if some operations point to the old schema, the lease period for the old schema is expired, and other operations point to the new schema.

In controlling concurrency during asynchronous schema updates in a database, a method may include receiving a snapshot of a table to be updated with a new schema, wherein the snapshot is taken at a given time, and wherein the table includes a number of rows. Each row may be read from the snapshot. Each row may also be read from the table to be updated at a second time. The rows read from the snapshot may be compared to the rows read from the table at the second time, and, based on the comparison, it may be determined which rows from the snapshot have not changed between the given time and the second time. Such rows that have not changed may be written to the table to be updated.

A system for controlling concurrency during asynchronous schema updates in a database may include one or more processors and a memory in communication with the one or more processors. The memory may store instructions executable by the one or more processors to receive a snapshot of a table to be updated with a new schema, wherein the snapshot is taken at a given time, and wherein the table includes a number of rows. The processor may further read each row from the snapshot, read each row from the table to be updated at a second time, and compare the rows read from the snapshot to the rows read from the table at the second time. Further, the processor may determine, based on the comparison, the rows from the snapshot that have not changed between the given time and the second time, and write the rows that have not changed to the table to be updated.

DETAILED DESCRIPTION

Figure 1:
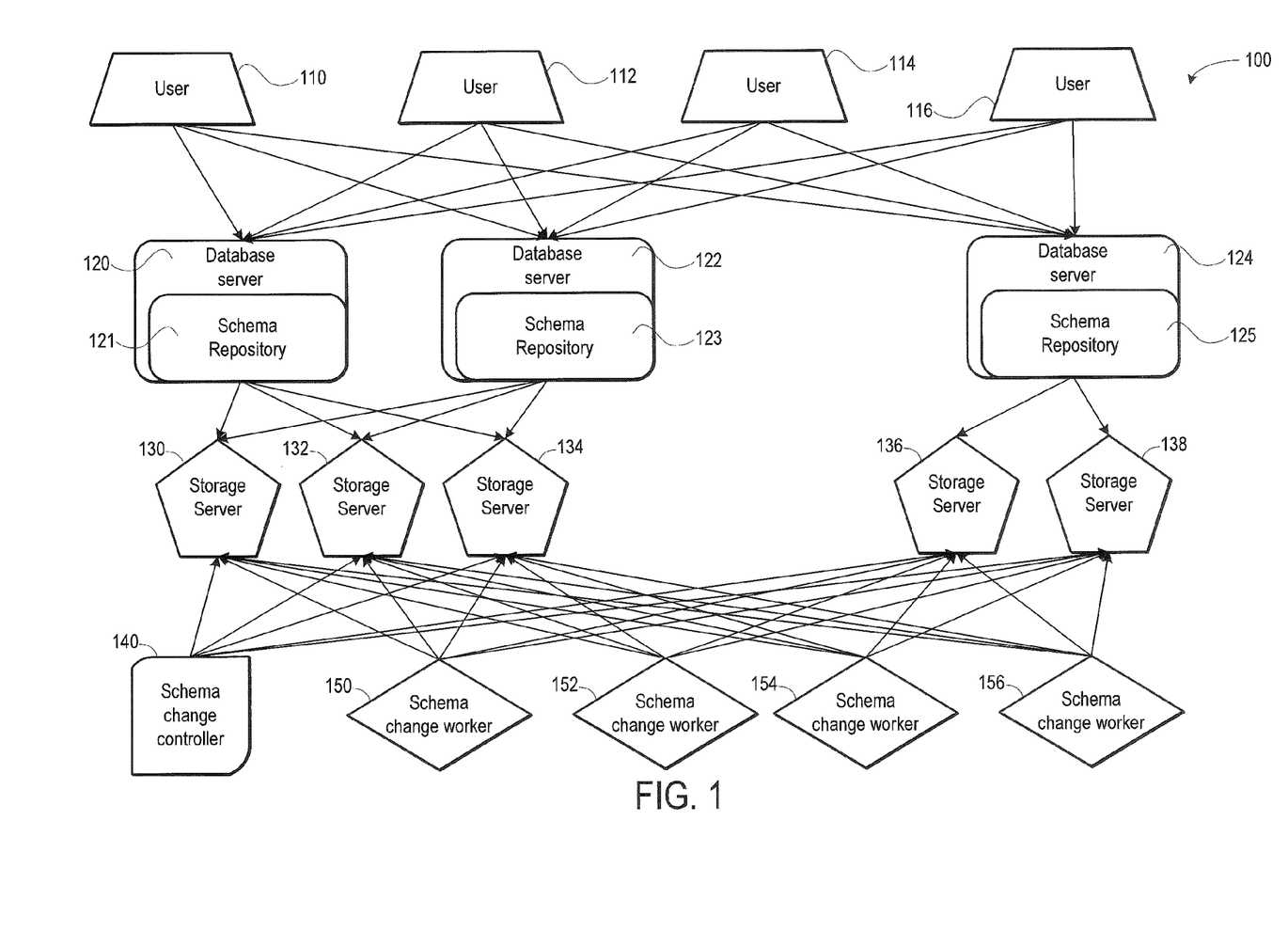
FIG. 1 is a schematic diagram of a network according to aspects of the disclosure.

FIG. 1 illustrates a database 100 according to aspects of the disclosure. The database 100 includes a plurality of database servers 120, 122, 124 coupled to a plurality of storage servers 130, 132, 134, 136, 138. The database servers 120-124 and storage servers 130-138 may be located in a same datacenter or distributed across multiple datacenters. For example, the database servers 120, 122 and storage servers 130-134 may be located in a datacenter in one geographical region, while the database server 124 and storage servers 126, 138 are located in another. According to some examples, while the storage servers 130-138 may be distributed in datacenters, the database servers 120-124 may be located elsewhere.

The storage servers 130-138 may handle operations such as data distribution. If data grows, the storage servers 130-138 may redistribute the data and split it across more servers.

The database servers 120-124 may handle organization and manipulation of the distributed data. For example, each of the database servers 120-124 may utilize a schema, which describes a layout of the database. For example, the schema may identify tables stored on the storage servers 130-138, columns in the tables, types of columns, names of columns, indexes correlating data values to the rows storing those values, etc. A given database server 120-124 may send requests to any of the storage servers 130-138 to which it is coupled. According to one implementation, a given database server will first attempt to use a storage server in the same datacenter, and if that storage server fails, a remote storage server may be used instead.

Figure 2:
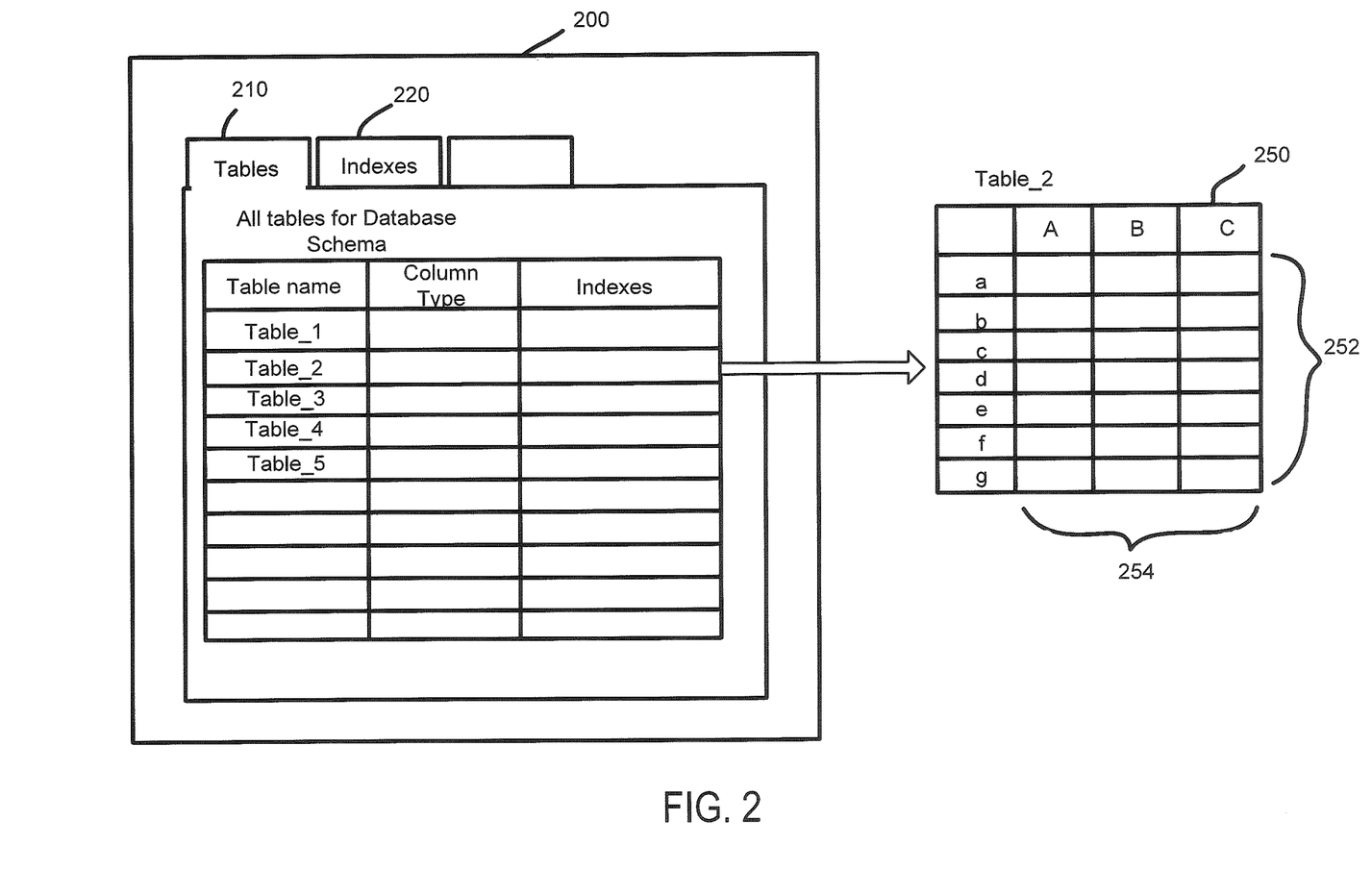
FIG. 2 is an example schema according to aspects of the disclosure.

FIG. 2 illustrates an example of a schema 200 according to aspects of the disclosure. As shown, the schema 200 may include tables 210, indexes 220, and other information. Each table may include a number of columns, where the columns may be of a specified type, and may also include any number of rows. For example, in Table_2 (250), there are seven rows 252 and three columns 254. Any number of rows or columns may be exist in a given table, however. Each entry in a specified column and row may include some form of data or information. Each table 210 may also be associated with any variety of other information, such as a list of indexes.

A given schema may be subject to a lease with the database servers 120-124. For example, after a predetermined period of time, the lease for a given schema may expire and will have to be renewed by the database server or updated with a new schema. The lease period may be, for example, two minutes. The database server may determine that this lease period has expired by comparing a current time to a lease expiry time. Further, the database server may determine that the schema has changed by reading a timestamp of the schema on the storage server. The lease may be renewed if, for example, the schema has not changed. If the schema has changed, a new schema may be read by the database server and a new lease with the new schema may be taken. Once the new lease on the new schema is taken, it may not be possible to obtain a lease on the old schema.

Returning to FIG. 1, the user devices 110-116 may be, for example, personal computers intended for use by a person, and having all of the components normally used in connection with a personal computer such as a central processing unit (CPU), memory (e.g., RAM and internal hard drives) storing data and instructions, an electronic display, and end user input (e.g., a mouse, keyboard, touch-screen or microphone). The user devices may also include a network interface device, a battery power supply or other power source, and all of the components used for connecting these elements to one another. Although the user devices 110-116 may each comprise a full-sized personal computer, they may alternatively comprise mobile devices capable of wirelessly exchanging data with a server over a network such as the Internet. Examples of requests which may be received at the database servers 120-124 from the user devices 110-116 include requests to insert rows into the tables stored on the storage servers 130-138, delete rows, or otherwise update the data stored in the tables.

Programs running on the user devices 110-116 may send requests to the database servers 120-124. The database servers 120-124 in turn send requests to the storage servers 130-138. Each database server may contain a schema repository 121, 123, 125 to manage different versions of a schema. For example, the schema repository may be responsible for renewing leases on a schema and initiating new leases with new schema. The schema repository renews its lease on a schema by reading the schema from the storage server that stores it. Each operation may have a pointer to its relevant schema. These pointers may be read-only or writable. The schema repository keeps the read-only and writable pointers to each schema version. If some schema version has no pointers, it can be deleted. If an old schema has expired but active operations include writable pointers to that expired schema, the schema repository terminates the database server running those operations. The schema repository may, however, distinguish between writable pointers and read-only pointers. A read-only pointer may be used for a longer period of time. For example, the read-only pointer may remain in use for an infinite period.

The schema change controller 140 may execute a schema change. To do so, the controller 140 receives a new schema as input and reads the old schema from one of the storage servers 130-138. As described in further detail below, schema changes may be effected in a plurality of stages in order to avoid concurrency anomalies and a need to shut down the servers for a period of time. Accordingly, the schema change controller 140 may form a number of intermediate schemas, such as between one and six intermediate schemas.

For every intermediate schema, the schema change controller may create schema change workers 150-156. Each schema change worker 150-156 may be a process executing a program. Each process may run on a separate computing device. Alternatively, some or all of the processes may run on the schema change controller 140 or one or more of the database servers 120-124 or storage servers 130-138. The schema change workers 150-156 may perform work that is required by the schema change, such as updating the database to make it compliant with the new schema. For example, the schema change workers 150-156 may add index entries corresponding to a new index for rows that do not have them, add a new lock to all rows that do not have it, remove a field that is being dropped from all columns that contain it, verify that the column on which we add a unique index does not contain duplicate values, etc. Once the workers 150-156 have completed all work, the schema change controller 140 may wait for the old schema lease period to expire and then write the intermediate schema to all the storage servers 130-138.

In performing the work required by the schema change, the schema change workers 150-156 read all rows in all tables that need to be updated. Each worker reads some fragment of the database, the fragments together composing the entire database, such that the entire database is reviewed by the workers 150-156 together. Each worker 150-156 may receive a snapshot of the database taken at a given time and read the database using the same snapshot. A snapshot refers to a state of the database that reflects all writes up to a given time, and no writes after that given time. The worker iterates over all rows it has received from the snapshot, and compares each column of the row to the same row as from the database at a current time. The columns from each row of the snapshot that have not changed as compared to the columns of each row read from the database may be written to an updated table in the database. For example, a row R from a table to be updated may include columns C1, C2, and C3. If the snapshot was taken at time T1, and a current read of row R from the database includes C1 timestamp=T1, C2 timestamp=T2, and C3 timestamp=T1, the worker will write columns C1 and C3 to the row of the updated table. Columns of each row that have changed between the snapshot and the row as read from the database at the current time will not be updated in the table, because these columns have already been updated by, for example, some user operation at a second time after the snapshot was taken. Thus, in the previous example, the worker will not write C2, which was already updated at a time T2 after the snapshot was taken. The side-effect of updating unchanged columns in every row based on a new schema is that those columns become compliant with the new schema. Specifically this means that index entries for the new index are added, entries representing new locks are added, and fields missing in the new column types are removed.

Figure 3:
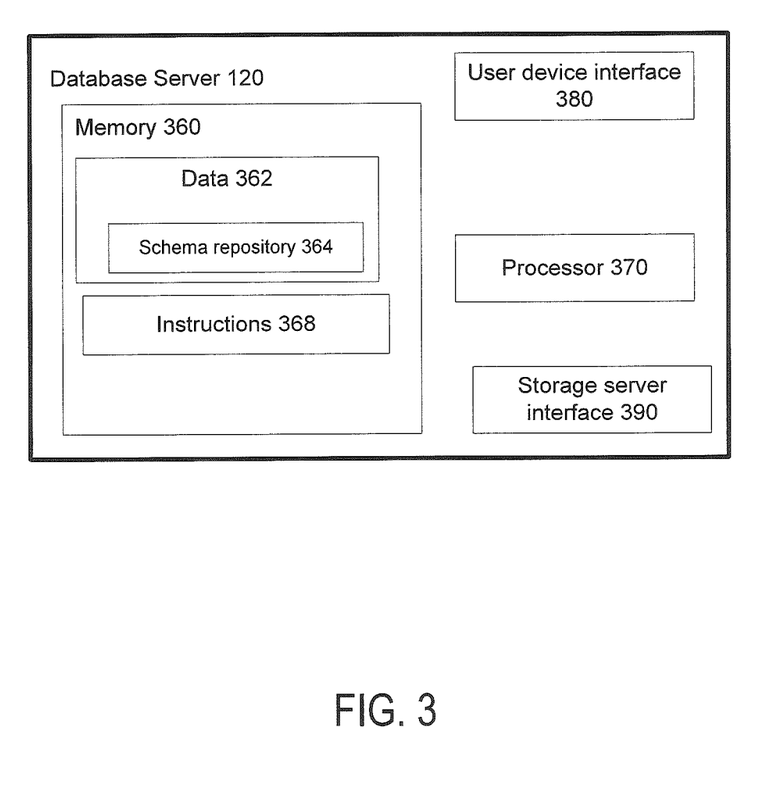
FIG. 3 is a block diagram of a database server according to aspects of the disclosure.

FIG. 3 illustrates an example database server, such as the database server 120. The server 120 may include a memory 360, including data 362 and instructions 368, and a processor 370 coupled to the memory 360.

The memory 360 stores information accessible by processor 370, including instructions 368, and data 362 that may be executed or otherwise used by the processor 370. The memory 360 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 368 may be any set of instructions to be executed directly (such as machine code) or indirectly (such as scripts) by the processor 370. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 362 may include information used to update schemas or handle requests from the user devices. For example, the data 362 may include a schema repository 364. The schema repository 364, which is discussed in further detail below in connection with FIG. 4, may be used to maintain multiple versions of a schema on one server.

The data 362 may be retrieved, stored or modified by processor 370 in accordance with the instructions 368. For instance, although the system and method is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The processor 370 may be any conventional processor. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

The database server 120 may further include interfaces to other components of the database 100. For example, a user device interface 380 may facilitate connection to one or more of the user devices 110-116. Similarly, a storage server interface 390 may facilitate connection to one or more storage servers 130-138.

Figure 4:
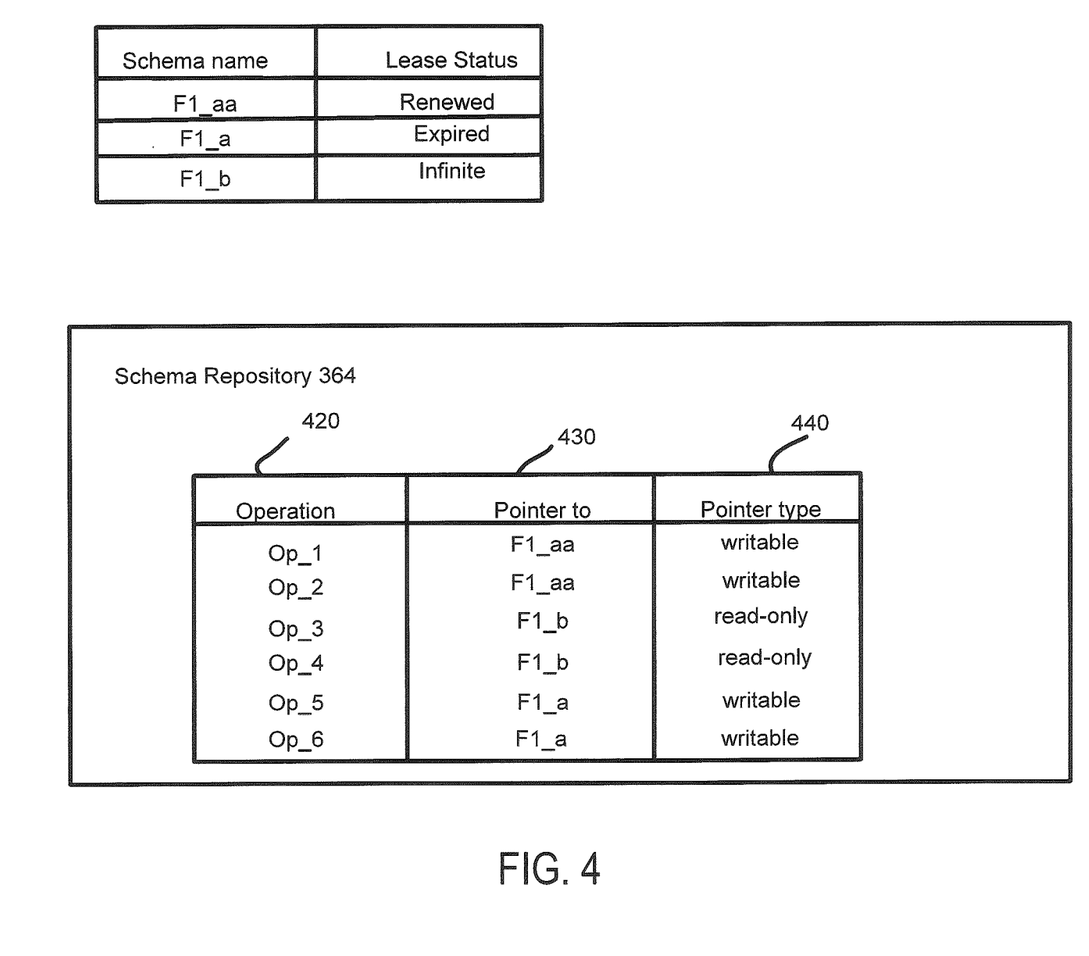
FIG. 4 is an example of a schema repository according to aspects of the disclosure.

FIG. 4 is an example of the schema repository 364. Many operations may be running on a given storage server at one time. The schema repository 364 may facilitate changing a schema on the given server from an old version to a new version without stopping processing or failing running operations. For example, the schema repository 364 may store multiple versions of a schema used by a server at one time. A schema version may be considered "new" until an updated version replaces it. Once it is replaced by an updated version, it becomes an "old" schema. For example, F1_aa is a new version of old schema version F1_a. For reference, FIG. 4 also shows a legend of each schema version maintained by the schema controller and its lease status (e.g., expired, renewed, infinite).

The schema repository 364 may identify a pointer 430 associated with each operation 420 running on the given storage server. The pointer 430 may indicate which schema is being used by that operation. The schema repository 364 may also identify a pointer type 440 for each operation 420 and/or pointer 430. For example, some pointers may be read-only pointers while others are writable pointers. In other words, the writable pointer may allow a corresponding operation to add or change data in a selected row or column of a table. The read-only pointer, however, may only allow the corresponding operation to read data from an entry in the table. In the example of FIG. 4, operations op_3 and op_4 include read-only pointers to schema version F1_b. Because all pointers to F1_b are read-only, F1_b may have an infinite lease period.

A lease may only be renewed on the new schema versions. For example, because op_1 and op_2 point to the new schema version F1_aa, when the lease on old schema version F1_a expires, that lease may not be renewed. In some instances, one operation may point to a new schema version while other active operations still point to an old schema version that has expired. For example, op_1 and op_2 point to new schema version F1_aa, while op_5 and op_6 point to the old schema version F1_a, which has expired. In this instance, the server running these operations may be terminated. For example, all processes running on that server may be stopped. If there are no pointers to a particular schema, that schema may remain unused. Similarly, if all operations pointing to an old schema have been removed, the old schema may also be removed.

Figure 5:
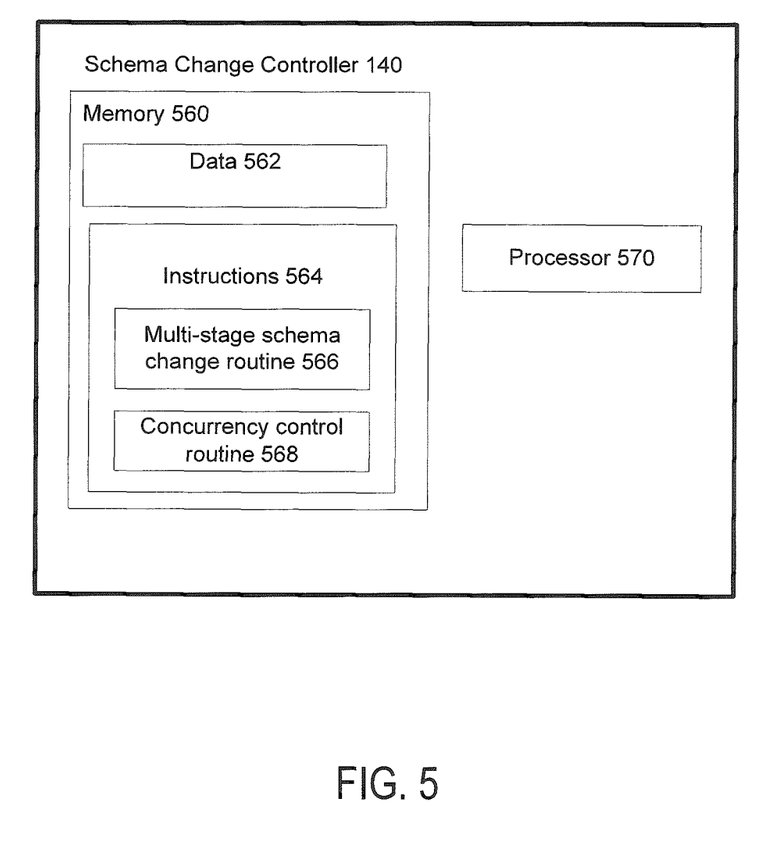
FIG. 5 is a block diagram of a schema change controller according to aspects of the disclosure.

FIG. 5 is a block diagram of an example schema change controller 140. Similar to the database server 120, the schema change controller 140 may include a memory 560, including data 562 and instructions 564, and a processor 570 coupled to the memory 560.

The memory 560 stores information accessible by processor 570, including instructions 564, and data 562 that may be executed or otherwise used by the processor 570. The memory 560 may be of any type capable of storing information accessible by the processor.

The instructions 564 may be any set of instructions to be executed directly or indirectly by the processor 570. For example, the instructions 564 may include a multi-stage schema change routine 566 and a concurrency control routine 568. The data 562 may be retrieved, stored or modified by processor 570 in accordance with the instructions 564.

The multi-stage schema change routine 566 may be executed to asynchronously update schema in a network without pausing processing or causing concurrency anomalies. The stages of this multi-stage routine are described in further detail below with respect to FIG. 6.

The concurrency control routine 568 may replace standard mechanisms of locking large portions of a database. The concurrency control routine 568 will update a column with data according to a new schema only if that column has not changed relative to a given timestamp. For example, the controller 140 may receive a snapshot of data, such as data in a table, at any time. Using this snapshot, the controller 140 may determine whether all data in the table has been updated using the new schema, or if some data is still unchanged. If some data in a row is changed and data in other columns of that row is not changed, the concurrency control routine 568 may take the changed data and write the unchanged data. In other words, the controller 140 may synthesize the different columns of each row separately based on the timestamp. To do this, the controller 140 may implement an algorithm such as MapReduce. MapReduce is an infrastructure for executing distributed computation, and may be input/output intensive. The algorithm may perform the computation in two parts—map and reduce, such that computation is performed in multiple subparts and then reduced together. By performing the concurrency control routine 568 in this way, if new indexes are created using the new schema, the indexes will be correct.

Figure 6:
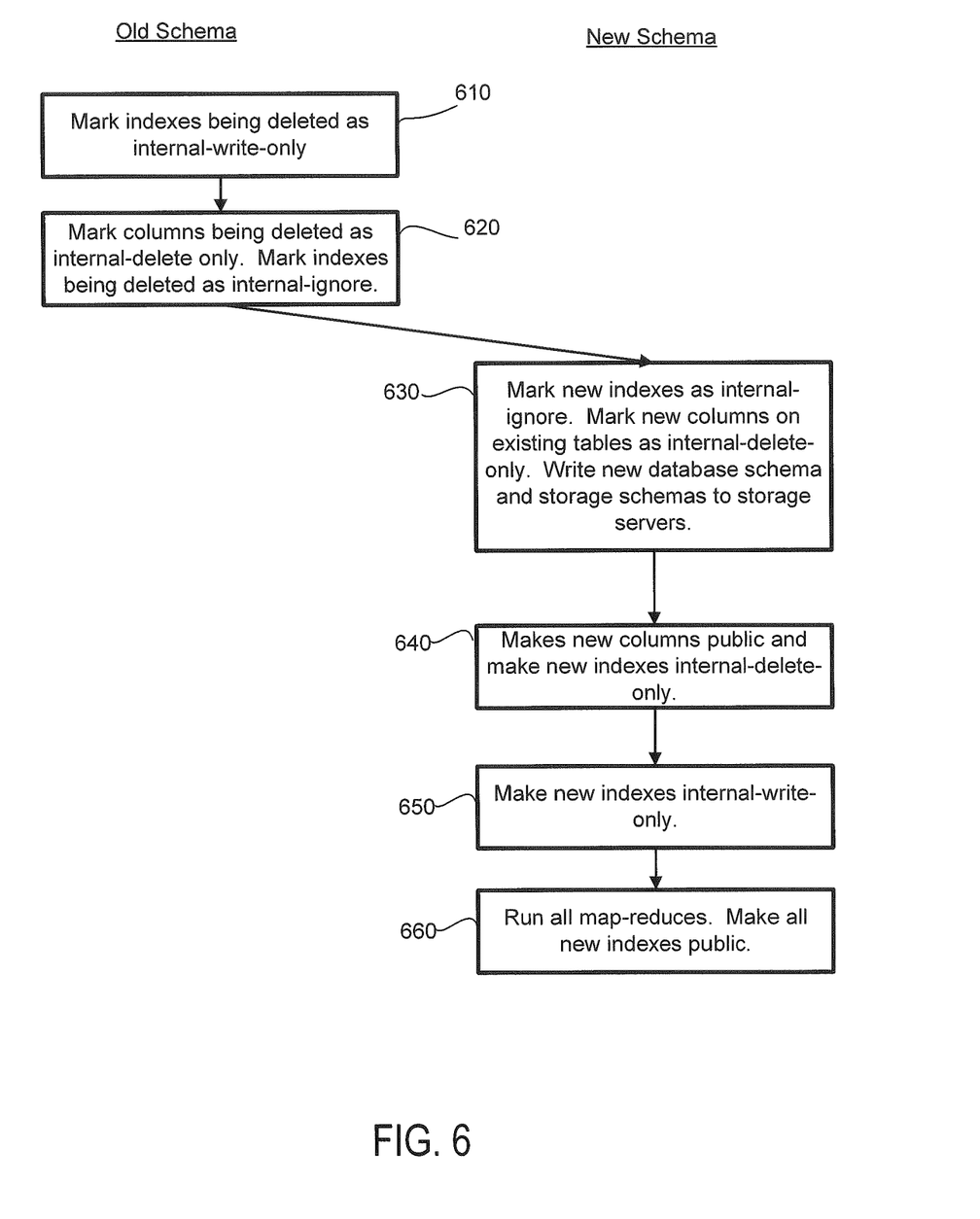
FIG. 6 is a flow diagram of an example method according to aspects of the disclosure.

FIG. 6 is a flow diagram of an example method of updating a schema in multiple stages, such that the new schema may be implemented without downtime and without concurrency anomalies. For example, as mentioned above in connection with FIG. 1, a schema being run by the database servers 120-124 may be updated with a new schema. Examples of schema changes include complex type (e.g., record or structure) schema changes, such as (1) add (required, optional, repeated) a field; (2) drop (required, optional, repeated) a field; (3) rename a type; (4) rename a field; (5) change a field type; (6) add/drop/rename enumator values (e.g., data types that allow a few discrete values for variables of this type); (7) change field semantics between optional, required, and repeated; and (8) change field default value. Further examples of schema changes include (1) add table, (unique or non-unique) index, column, lock; (2) drop table, index, column, lock; (3) change non-protocol column type; (4) add, drop, rename enumator values; (5) change unique index to non-unique and vice versa; (6) rename table, index, column, lock; (7) change lock coverage; (8) change primary key; (9) reparenting tables.

To effect the multi-stage schema change, particular states of schema elements may be defined, and different stages of the schema change may be applied to elements in the particular states. These states are described below:

An internal-delete-only state may describe a column if the database server deletes it when a row is being deleted, but no other operations are permitted on the column. The column is also not visible in a list of columns available for that table. The internal-delete-only state may also describe an index if the database server deletes it when the corresponding row is being deleted. However, no other operations are permitted on the index. Such an index is not visible in the list of indexes available for that table.

An internal-ignore state may describe an index if the database server is not aware of it. Such an index is not visible in the list of indexes available for that table and cannot be used for reads or writes.

An internal-write-only state may describe an index if the database server inserts, modifies, or deletes it when the corresponding row is inserted, modified, or deleted. However, no reads are permitted on the index. Such an index is not visible in the list of indexes available for that table.

Using these states, an asynchronous change from an old schema to a new schema may be performed in stages. An example of these stages is set forth in FIG. 6. These stages may be performed by, for example, the schema change controller. At each stage, an intermediate schema may be formed. After each stage is performed, the schema change controller may wait for the lease period of the intermediate schema to expire before proceeding to the next stage. In this regard, each database server will use at most two schema versions at any one time. While FIG. 6 shows these stages as occurring in a particular order, the order may be modified, and stages may be added or omitted.

In stage 1, (block 610), all indexes being deleted from the old schema are marked internal-write-only. The indexes maybe marked, for example, using a temporary indicator in the schema or elsewhere in the database. In this regard, should the schema change controller crash and lose all of its state information, another controller can start and pick up from wherever the schema change was interrupted. According to another example, the marking may be a restriction placed on the indexes/columns to control access to the indexes/columns by other data or devices.

In stage 2, (block 620), all columns being deleted from the old schema are marked internal-delete-only. All indexes being deleted from the old schema are marked internal-ignore. The old schema is written back to storage.

In stage 3, (block 630), all new indexes in the new schema are marked as internal-ignore. All new columns on existing tables in the new schema are marked as internal-delete-only. The new database schema and storage schemas are written to the storage.

In stage 4, (block 640), the new columns of the new schema are made public. For example, the new columns of the new schema are available for all operations and visible when enumerating columns. This is the "normal" state of a column, for example, as opposed to one of the restricted states of internal-delete-only or internal-write-only. Also in stage 4, the new indexes are marked internal-delete-only.

In stage 5, (block 650), the new indexes of the new schema are marked internal-write-only.

In stage 6, (block 660), all map-reduce algorithms are run. The map-reduce algorithms may make the data compliant with the new schema. For example, for now indexes, the map-reduce algorithms add index entries on rows that do not have them, add new locks to rows that do not have them, etc. Once the map-reduces are finished executing, all new indexes are made public.

Despite the fact that we create intermediate database schemas during this process, intermediate storage schemas are not created. The storage schema transitions from the old schema to the new schema at stage 3.

The above-described aspects of the technology may be advantageous in enabling schema updates to occur without concurrency anomalies or significant downtime in a database. Accordingly, processes may continue to run throughout the schema change without causing errors or database corruption. This is not only practical, but cost efficient as it reduces need for significant labor and repairs after a schema update takes place. Particular aspects of the disclosure may each have their own benefits. For example, implementing a new schema in multiple stages prevents data corruption if the new schema is applied at each database server asynchronously. Without using the multiple-stage implementation, the schema change would either risk database corruption or require a shutdown of all database servers for the duration of the schema change. This would severely degrade system availability. The aspect of maintaining multiple versions of a schema in the schema repository avoids delaying or failing user operations during a schema change. Accordingly, it minimizes impact on users during the schema change and improves system availability. The aspect of concurrency control eliminates a need to lock an entire table or multiple tables for the duration of a schema change. Therefore, this avoids delaying or failing user operations during a schema change, thereby minimizing impact on users and improving system availability.

Although the present disclosure makes reference to particular examples, it should be understood that these examples are merely illustrative of the principles and applications of the subject matter of the claims. For example, it should be understood that the described system and method may be implemented over any type of database or other network. Additionally, it should be understood that numerous other modifications may be made to the illustrative examples. However, these and that other arrangements may be devised without departing from the spirit and scope of the subject matter defined by the appended claims.

The invention claimed is:

1. A system for updating a database server with a schema change, the system comprising:
a controller in communication with the database server, the controller comprising a memory storing data and instructions, and a processor in communication with the memory and configured to:
set at least one state for a given element of a new schema to be implemented in place of an existing schema, wherein the at least one state restricts how the database server handles data associated with the given element of the new schema;
implement the new schema in stages based at least on the state of the given element of the new schema; and
when the new schema is fully implemented, update the given element to remove any restrictions placed on the data by the at least one state.

2. The system of claim 1, wherein the at least one state comprises at least one of:
an internal-delete-only state, wherein no operations are permitted on the element except for deletion of a row, and the element is not visible to the database server in a list of available elements;
an internal-ignore state, wherein the element is not visible to the database server in the list of available elements and cannot be used for reads or writes; and
an internal-write-only state, wherein the database server inserts, modifies, or deletes the element when a corresponding row is inserted, modified, or deleted.

3. The system of claim 1, wherein the processor is further configured to set at least another state for given elements of the existing schema, wherein the at least another state restricts how the database server handles data associated with the given elements of the existing schema.

4. The system of claim 1, wherein an intermediate schema is formed at each stage.

5. The system of claim 4, wherein the processor is further configured to wait for a lease period of the intermediate schema to expire before implementing the next stage.

6. A system for managing different versions of schemas, comprising:
a database server being updated from an old schema to a new schema;
a schema repository including an identification of all schemas running on the database server at a given time, a lease period associated with each schema, an identification of operations running on the database server, and a pointer associated with each operation, wherein the pointer indicates which schema the operation is using;
a memory; and
a processor in communication with the memory and configured to:
determine, based on information in the schema repository, an action to execute, the action comprising one of renewing the lease on the new schema, deleting the old schema, and terminating all operations on the database server; and
execute the determined action.

7. The system of claim 6, wherein the processor determines to renew the lease on the new schema if an operation includes a pointer to the new schema and the lease period associated with the old schema is expired.

8. The system of claim 6, wherein the processor determines to delete the old schema if no operations point to it.

9. The system of claim 6, wherein the processor determines to terminate all operations on the server if some operations point to the old schema, the lease period for the old schema is expired, and other operations point to the new schema.

10. The system of claim 6, wherein the processor further determines whether the pointer associated with each operation is a read-only pointer or a writable pointer.

11. The system of claim 10, wherein if the pointer is determined to be a read-only pointer, the pointer can remain in use for an infinite time.

12. A system for controlling concurrency during asynchronous schema updates in a database, comprising:
   a schema change worker, comprising a memory and one or more processors in communication with memory and configured to:
      receive a snapshot of the database taken at a given time, the snapshot including a table to be updated;
      read each row from the snapshot;
      read each row from the table to be updated at a second time;
      compare the rows read from the snapshot to the rows read from the table at the second time;
      determine, based on the comparison, the rows from the snapshot that have not changed between the given time and the second time; and
      write the rows that have not changed to the table to be updated.

13. The system of claim 12, wherein the second time is a current time.

14. The system of claim 12, wherein the comparing the rows read from the snapshot to the rows read from the table at the second time is performed iteratively by column.

15. The system of claim 14, wherein the writing the rows that have not changed to the table to be updated comprises writing each column that has not changed in each row to the table.

16. The system of claim 12, further comprising a plurality of schema change workers, wherein schema change worker reads a fragment of the database, the fragments together making up the entire database.

* * * * *